Patented June 12, 1951

2,556,275

UNITED STATES PATENT OFFICE 2,556,275

PROCESS OF TREATING A HYDROCARBON SYNTHESIS NAPHTHA PRODUCT

Charles E. Hemminger, Westfield, N. J., assignor to Standard Oil Development Company, a corporation of Delaware No Drawing. Application September 11, 1946, Serial No. 696,340

2 Claims. (Cl. 260—450)

My invention relates to improvements in the art of synthesizing hydrocarbons from carbon monoxide and hydrogen. In particular, it relates to treating the crude hydrocarbon synthesis products recovered from the synthesis reaction by dehydrating oxygenated hydrocarbons contained therein. That is to say, the said crude products contain a quantity of oxygenated hydrocarbons, which oxygenated hydrocarbons are dehydrated and polymerized to remove oxygen and improve the octane number and volatility characteristics of the product.

I am aware that prior to my invention others have synthesized hydrocarbons boiling in the gasoline boiling range by reacting together carbon monoxide and hydrogen in the presence of a suitable catalyst at reaction temperatures and pressures. Prior to my invention cobalt has been used as a catalyst for promoting the synthesis wherein carbon monoxide and hydrogen react to form hydrocarbons. One form of the cobalt catalyst previously used consisted essentially of cobalt supported on kieselguhr, containing about 2 per cent thoria, the latter being a promoter. More recently, however, iron with alkali metal promoters has been employed as a catalyst for hydrocarbon synthesis, using carbon monoxide and hydrogen as reactants. In the synthesis of hydrocarbons from carbon monoxide and hydrogen, a ratio of 1 mol of carbon monoxide to 1 mol of hydrogen has been employed when the catalyst was iron. I have found that this ratio of hydrogen to carbon monoxide using an iron catalyst may be varied somewhat with improved results, i. e., I have found that good results may be obtained when the ratio of hydrogen to carbon monoxide is about 1.9 mols of hydrogen per mol of carbon monoxide in the fresh feed, which hydrogen ratio is obtained by reacting natural gas with oxygen at 2200° F. As previously indicated, however, the product has been found to contain alcohols, aldehydes and other oxygenated hydrocarbons which are, of course, undesirable if the main product is to be gasoline. I have now discovered improved means for dehydrating these oxygenated hydrocarbons to form olefinic hydrocarbons which are simultaneously polymerized to form normally liquid hydrocarbons boiling within the gasoline boiling range.

One object of my present invention, therefore, is to produce a maximum quantity of good quality gasoline from carbon monoxide and hydrogen in a hydrocarbon synthesis operation performed in the presence of a metallic iron catalyst.

Another object of my present invention is to improve the crude gasoline products produced by reacting together carbon monoxide and hydrogen in suitable proportions in the presence of an iron catalyst, by dehydrating oxygenated compounds in said products and simultaneously polymerizing the thus formed olefins in the presence of a polymerizing catalyst under polymerizing conditions.

Other and further objects of my invention will appear in the following more detailed description and claims.

At the outset I wish to point out that in dehydrating the crude hydrocarbon synthesis product, that is to say, the gasoline or naphtha produced in such process, I separate the gasoline or naphtha into two portions, as follows:

1. A cut or fraction boiling from 0° or $C_2$ to about 200° to 225° F., and
2. The fraction boiling from 200° F. to the end point of the gasoline or naphtha fraction, namely, about 430° F.

I treat the fraction boiling from $C_2$ to 200° F. at elevated temperatures and pressure in the presence of a polymerization catalyst such as a silica-alumina composition (e. g., $12SiO_2 1Al_2O_3$ by weight and in the form of a gel) copper pyrophosphate mixed with activated carbon, or phosphoric acid impregnated on a carrier such as kieselguhr and calcined. In making the latter, about 15 to 20 parts by weight of the acid are impregnated on 75 to 80 parts by weight of the carrier, dried and calcined for several hours at 500° F. to 1000° F. to form a known catalyst, often referred to in the art as "solid phosphoric acid" catalyst. The fraction boiling from about 200° F. to the end point of the gasoline is treated in the presence of bauxite at elevated temperatures and pressure. The fraction boiling from $C_2$ to about 200° F. will contain normally gaseous olefinic compounds, i. e., ethylene, propylene and butylene. When normally gaseous olefins are polymerized, they will form mostly acyclic hydrocarbons, but will form some aromatic hydrocarbons, both of which products are normally liquid but boil within the gasoline boiling range. On the other hand, it is undesirable to polymerize the olefins formed by dehydrating the product boiling from about 200° to 430° F. for polymers of these would boil above the gasoline boiling range. Consequently, this heavier fraction is treated in the presence of bauxite merely to remove water, leaving unpolymerized olefin.

In order to give a fuller and better understanding of my invention, I set forth below a specific example illustrating the invention, but it is to be clearly understood that the specific details therein enumerated are not limiting and are to be considered as merely illustrative of my invention.

Using a powdered iron catalyst prepared from spent pyrites and containing 1 per cent by weight of a promoter such as $K_2CO_3$, a yield of 200 to 250 cc. of liquid hydrocarbons per cubic meter of feed gas was obtained. The conditions were as follows: the iron catalyst was subdivided so that the major portion thereof had a particle size of from 40 to 60 microns with less than 25 per cent below 20 microns and the largest aggregates, 200 microns. The catalyst was formed into a suspension or a fluidized bed by feeding to a reactor containing the catalyst, a gas containing 60 per cent hydrogen and 40 per cent carbon monoxide at a rate of 10 to 15 volumes of gas, measured at standard conditions, per pound of catalyst in the reactor, per hour. A temperature of around 650° F. and a pressure of 300 pounds per square inch were maintained in the reactor. The product was withdrawn from the reactor and cooled sufficiently to condense the normally liquid hydrocarbons and the water into a two liquid layer condensate. Noncondensible hydrocarbons, being part of the $C_2$, a major portion of the $C_3$ and all of the $C_4+$ hydrocarbons formed in the process, were recovered in a conventional oil scrubbing process using a solvent oil and after removal from said solvent were added to the hydrocarbon condensate. A yield of 10 to 33 cc. per cubic meter of feed gas of oxygenated products soluble in the water layer was obtained. The recovered hydrocarbons were separated into three fractions, as follows: a fraction containing $C_2$ to about 200° F., a fraction boiling from about 200° to 400° F. and a third fraction boiling above 400° F. The intermediate fraction was bauxite treated, subsequently to be described. The lightest fraction, that is, the fraction boiling from $C_2$ to 200° F. was treated with the phosphoric acid catalyst to remove the elements of water from oxygenated hydrocarbons in this fraction and simultaneously to cause polymerization of the major portion of the olefins thus formed.

The light hydrocarbons (i. e., the $C_2$ to 200° F.) were altered in boiling range and rendered stable by passing them over the phosphoric acid catalyst at 50 to 500 volumes of liquid feed per volume of catalyst per hour, with temperatures in the order of 400° to 600° F. and at pressures greater than 300 p. s. i. g., preferably at 600 to 700 p. s. i. g. A weight recovery of about 95 per cent was obtained and the boiling range of the product was such that, after removal of propane and lighter hydrocarbons by distillation, the said product was included in gasoline blends. The Reid vapor pressure of the product, after depropanization, was less than 10 p. s. i. g. The octane (ASTM clear) was 81 to 85 and the Research octane number was from 95 to 100. Steam in the amount of 3 to 5 mol per cent of feed was added to maintain the catalyst at least partially hydrated. No carbon was formed and the catalyst was used until 50 to 100 gallons of product was processed per pound of catalyst. The absence of a carbon loss in this phosphoric acid catalyst treatment is one of the advantages of this mode of processing because if this fraction were included in the bauxite treatment subsequently described, there would be carbon deposition and loss from this lighter fraction. Also, the boiling range would be decreased, the mid-boiling point being lower, rather than increased, so that all of the original product could not be included in the gasoline without exceeding normal volatility specifications for Reid vapor pressure and boiling range. Again, the octane improvement would be less, the same fraction having 79 to 81 octane number (ASTM) rather than 81 to 85 octane number.

The intermediate cut of 200° to 400° F. mentioned before was subjected in a reactor to treatment with bauxite at 0.5 to 5 volumes of liquid feed per volume of catalyst per hour at 850° F. and 10 to 50 p. s. i. g. with 5 to 10 mols of steam per 100 mols of oil. The elements of water were thus removed. The octane number was increased to 75 to 77 ASTM and 85 to 90 Research testing methods (both clear) with a yield of 90 to 95 volume per cent. The product was stable and made an excellent motor gasoline. It is often desirable to limit the intermediate cut to be bauxite treated, to the 300° to 350° F., wherein the 350° to 400° F. fraction is added to the third or heavier cut. Since the untreated 350° to 400° F. fraction is low in octane number (about 60 to 70 octane number ASTM), the octane number of the blend of bauxite and phosphoric acid treated material will be higher if it is omitted, but the yield omitting the 350° to 400° F. portion will, of course, be lower, say, 5 to 10 per cent.

The third cut (350° to 400° F. and higher boiling cut) is not directly useful as gasoline and it must be cracked either catalytically or thermally to obtain proper boiling range. It may also be hydrogenated to make a Diesel oil or used directly as industrial fuel oil or a source of chemical raw materials, e. g., synthetic lubricating oils. The processing of this portion is not a part of this invention.

A second method of processing the synthesis product is to remove the $C_2$, $C_3$, and $C_4$ fraction from the first cut ($C_2$ to 200° F. discussed), i. e., to "debutanize" the said fraction. This fraction is polymerized in a separate phosphoric acid catalyst reactor under the same conditions as given above for the total $C_2$ to 200° F. cut, as is also separately treated the remaining $C_5$ to 200° F. fraction. At the expense of thus separately treating the two fractions and employing two reactors, slightly better yields are obtained.

With respect to the catalyst mentioned hereinbefore, I have stated that I employ an iron catalyst. Many forms of iron catalyst are available; for example, a good catalyst is formed by reducing spent pyrites promoted with 0.5 to 5 per cent of alkalis such as $K_2CO_3$, KF, $K_2O$, $Na_2CO_3$, etc. As is generally known, pyrites is roasted in a sulfuric acid plant to convert the sulfur to sulfur dioxide, leaving a pyrites ash which is mostly iron oxide but which also contains traces of sulfur. This product is further roasted in the presence of air or oxygen to convert it as completely as it may be possible to iron oxide. This iron oxide is then at least partially reduced in the presence of hydrogen at a temperature of the order of 700° to 900° F., or at some other suitable temperature, and a pressure of 200 to 500 pounds per square inch, whereupon a product is obtained which is catalytic and adapted for promoting the conversion of the oxides of carbon and hydrogen into hydrocarbons. The most modern method for synthesizing hydrocarbons from carbon monoxide and hydrogen is a method in which the catalyst in powder form is suspended in the reactants in the reaction zone to form a "fluidized" catalyst, that is to say, a dense, turbulent, ebullient suspension of a catalyst in the gasiform material. Petroleum technologists are now fairly familiar with the fluid catalyst type of operation, particularly as applied to catalytic cracking, where it has been in large scale commercial use in this country for several years.

In carrying out my hydrocarbon synthesis reaction, I prefer to employ the fluid catalyst type of operation, but, of course, it is to be understood that my improvements are applicable to a crude hydrocarbon synthesis product comprising gasoline and containing oxygenated hydrocarbons regardless of the type of operation in which this material is formed. In other words, it may be produced in a fluid catalyst system or in a system employing a stationary bed catalyst.

To recapitulate briefly, I have discovered a means for improving the quality of a naphtha or gasoline produced by synthesizing the same from carbon monoxide and hydrogen reacted together under proper conditions of temperature and pressure in the presence of an iron catalyst by treating that portion of the synthetic naphtha boiling from 0° to about 200° F. at temperatures of 400° to 600° F. under a pressure of 400 to 1000 pounds per square inch gauge in the presence of a so-called solid phosphoric acid catalyst, whereupon oxygenated hydrocarbons are converted by dehydration to olefins, which olefins are then polymerized to form acyclic and aromatic hydrocarbons boiling within the gasoline boiling range. With respect to the higher boiling portion of the gasoline or naphtha, I treat the same at temperatures of 850° to 950° F. and at pressures of about 10 to 50 pounds per square inch gauge with a space velocity of 1 volume of liquid feed per volume of catalyst per hour in a reaction zone containing a quantity of bauxite. The thus-treated portions of the gasoline or naphtha are then combined to form a mixture, boiling within the gasoline boiling range, of improved octane number, further improved from the standpoint of being less corrosive, forming no gum on storage, and not offensive in odor. It will be understood, of course, that the portion of gasoline treated in the presence of the solid phosphoric acid catalyst need not necessarily be limited to that fraction boiling from $C_2$ to 200° F. but may include a fraction boiling from, say, $C_2$ to 225° F., or a portion of said fraction. The remainder of the gasoline, that is, the higher boiling constituents, are then treated separately at high temperatures and pressure in the presence of bauxite and then the two portions are recombined to form the improved gasoline fraction.

Having described my invention in the best manner in which it may be performed, what I claim is:

1. The method of improving the quality and quantity of synthetic naphtha containing oxygenated compounds synthesized by hydrogenation of carbon monoxide in the presence of an iron catalyst and boiling up to about 400° F. which comprises separating a fraction boiling from about 0° to about 225° F. from the remainder of the said naphtha, subjecting the said fraction to the influence of a dehydrating and polymerizing catalyst containing phosphoric acid at a temperature between about 400° and 600° F. and under pressure above about 400 pounds per square inch for a sufficient period of time to split off water from oxygenated compounds contained in said naphtha to form olefinic hydrocarbons and to cause polymerization of resulting olefins to form acyclic and aromatic hydrocarbons boiling in the gasoline boiling range, subjecting the remainder of the naphtha to the influence of a dehydrating catalyst having no polymerizing action at the temperature of operation at a temperature between about 850° F. and 950° F. for a sufficient period of time to split off water from oxygenated compounds contained therein, but whereby no significant fragmentation of hydrocarbons occurs, and thereafter combining the thus treated fractions.

2. The method of improving the quality and quantity of synthetic naphtha containing oxygenated compounds synthesized from carbon monoxide and hydrogen at elevated temperatures in the presence of an iron catalyst which comprises separating a fraction boiling from about 0° to 200° F. from the remainder of the said naphtha, debutanizing said fraction, subjecting the debutanized fraction to the influence of a dehydrating and polymerizing catalyst containing phosphoric acid at a temperature between about 400° and 600° F. and under a pressure above about 400 pounds per square inch for a sufficient period of time to split off water from oxygenated compounds contained therein to form olefinic hydrocarbons and to cause polymerization of said olefins, subjecting the $C_2$, $C_3$, and $C_4$ hydrocarbons removed by the said debutanizing step to the influence of the same dehydrating and polymerizing catalyst under substantially the same condition for a sufficient period of time to split off water from oxygenated compounds contained therein to form olefinic hydrocarbons and to cause polymerization of olefinic hydrocarbons, subjecting the remainder of the original naphtha to the influence of a dehydrating catalyst having no polymerizing action at the operating temperature at a temperature between about 850° and 950° F. for a sufficient period of time to split off water from oxygenated compounds contained therein but whereby no significant fragmentation of hydrocarbons occurs, and thereafter combining the three treated portions of the original naphtha.

CHARLES E. HEMMINGER.

REFERENCES CITED

The following references are of record in the file of this patent:

UNITED STATES PATENTS

| Number | Name | Date |
|---|---|---|
| 2,116,081 | Pier et al. | May 3, 1938 |
| 2,264,427 | Asbury | Dec. 2, 1941 |
| 2,436,962 | Gaucher | Mar. 2, 1948 |
| 2,438,449 | Moseman | Mar. 23, 1948 |

FOREIGN PATENTS

| Number | Country | Date |
|---|---|---|
| 735,276 | Germany | May 11, 1943 |